United States Patent
Gusler et al.

(10) Patent No.: US 6,658,092 B1
(45) Date of Patent: Dec. 2, 2003

(54) METHOD, APPARATUS AND COMPUTER PROGRAM PRODUCT FOR AUTHORIZING RE-RECORDING

(75) Inventors: Carl Phillip Gusler, Austin, TX (US); Rick Allen Hamilton, II, Charlottesville, VA (US); Stephanie Elise Woods, Pearland, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/183,860

(22) Filed: Jun. 26, 2002

(51) Int. Cl.$^7$ ................................................. H04M 1/64
(52) U.S. Cl. ..................... 379/67.1; 379/68; 379/88.12; 379/88.17; 379/88.19; 379/88.1; 379/88.22
(58) Field of Search ..................... 379/67.1, 68, 88.12, 379/88.17, 88.18, 88.19, 88.22, 211.02, 212.01, 88.01; 455/412, 413, 466, 550, 551

(56) References Cited

U.S. PATENT DOCUMENTS

| | | | |
|---|---|---|---|
| 4,885,763 A | 12/1989 | O'Brien et al. ................ 379/67 |
| 4,972,461 A | * 11/1990 | Brown et al. .................. 379/67 |
| 5,003,577 A | 3/1991 | Ertz et al. ....................... 379/89 |
| 5,033,077 A | 7/1991 | Bergeron et al. .............. 379/67 |
| 5,081,668 A | 1/1992 | Ito ............................... 379/58 |
| 5,249,217 A | 9/1993 | Lee ............................... 379/58 |
| 5,329,578 A | 7/1994 | Brennan et al. ............... 379/67 |
| 5,497,413 A | 3/1996 | Nakano ........................ 379/89 |
| 5,583,915 A | 12/1996 | Ishida .......................... 379/58 |
| 5,608,786 A | * 3/1997 | Gordon ....................... 379/100 |
| 5,740,543 A | 4/1998 | Maeda ........................ 455/550 |
| 5,768,349 A | 6/1998 | Knuth et al. .................. 379/88 |
| 5,875,232 A | 2/1999 | Wolf ............................ 379/88 |
| 5,926,524 A | 7/1999 | Taylor ...................... 379/88.08 |
| 5,995,594 A | 11/1999 | Shaffer et al. ........... 379/88.12 |
| 6,021,325 A | 2/2000 | Hall ............................ 455/412 |
| 6,032,053 A | 2/2000 | Schroeder et al. .......... 455/553 |
| 6,061,432 A | 5/2000 | Wallace et al. .......... 379/88.18 |
| 6,163,606 A | 12/2000 | Otto ............................ 379/211 |
| 6,201,857 B1 | * 3/2001 | Hamley ..................... 379/88.1 |
| 6,215,858 B1 | * 4/2001 | Bartholomew et al. .. 379/88.17 |
| 6,222,909 B1 | 4/2001 | Qua et al. ................. 379/88.22 |
| 6,282,269 B1 | * 8/2001 | Bowater et al. ......... 379/88.17 |
| 6,301,338 B1 | 10/2001 | Makela et al. ........... 379/88.21 |
| 6,337,977 B1 | 1/2002 | Ranta ......................... 455/413 |
| 6,463,142 B1 | * 10/2002 | Kilp ....................... 379/201.06 |

OTHER PUBLICATIONS

U.S. patent application Ser. No. 09/692,391, Bhogal et al., filed Oct. 19, 2000.

U.S. patent application Ser. No. 09/895,091, Ishmael et al., filed Jun 29, 2001.

Cohen et al., "Portable Voice Messaging System", IBM Technical Disclosure Bulletin, vol. 38, No. 07, Jul. 1995, pp. 257–259.

"The cellular phone which has answering functions by pushing its buttons", IBM Research Disclosure 433140, May 2000, p. 946.

* cited by examiner

*Primary Examiner*—Allan Hoosain
(74) *Attorney, Agent, or Firm*—Leslie A. Leeuwen; Anthony V.S. England

(57) ABSTRACT

In one form of the invention, a method for authorizing distribution of a telephone recording includes announcing for a first message-recording apparatus that a telephone caller can record a message. The message is recorded by the first message-recording apparatus, and a key is automatically associated with the message. The key authorizes transferring the message to a second message-recording apparatus.

26 Claims, 7 Drawing Sheets

<BEGINKEY><DATE><TIME><ADDR1><ADDR2><AUTH><ENDKEY>

METHOD, APPARATUS AND COMPUTER PROGRAM PRODUCT FOR AUTHORIZING RE-RECORDING

BACKGROUND

1. Field of the Invention

This invention concerns authorizing distribution of a telephone recording, and more particularly concerns automatically associating a key with the recording that authorizes transferring the recording.

2. Related Art

In recent years there has been tremendous growth in telecommunications technology. Even though cell phone high-speed data services are only just beginning, there are reportedly already 130 million cell phones in use in the United States as of mid-2002. The Cellular Telecommunications and Internet Association, a trade group, reports that in the year 2002 billable cell phone calling will exceed half a trillion minutes. Due to the nature of their use, it is particularly useful to include in cell phones a message recording functionality. Another message recording telecommunications technology, voicemail, predates the mass proliferation of cell phones, but the use of voicemail continues to rapidly increase. Despite the spread of cell phones and voicemail, there has not been a correspondingly great increase in user aids for managing these two telecommunications technologies. Consequently, a need exists for improving that management, and particularly for improving management of integrated cell phone and voicemail use.

SUMMARY

The foregoing need is addressed in the present invention. According to a method form of the invention, a method for authorizing distribution of a telephone recording includes announcing for a first message-recording apparatus that a telephone caller can record a message. The message is recorded by the first message-recording apparatus, and a key is automatically associated with the message. The key authorizes transferring the message to a second message-recording apparatus.

Objects, advantages, additional aspects and other forms of the invention will become apparent upon reading the following detailed description and upon reference to the accompanying drawings.

DETAILED DESCRIPTION OF A PREFERRED EMBODIMENT

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figures 1, 2:
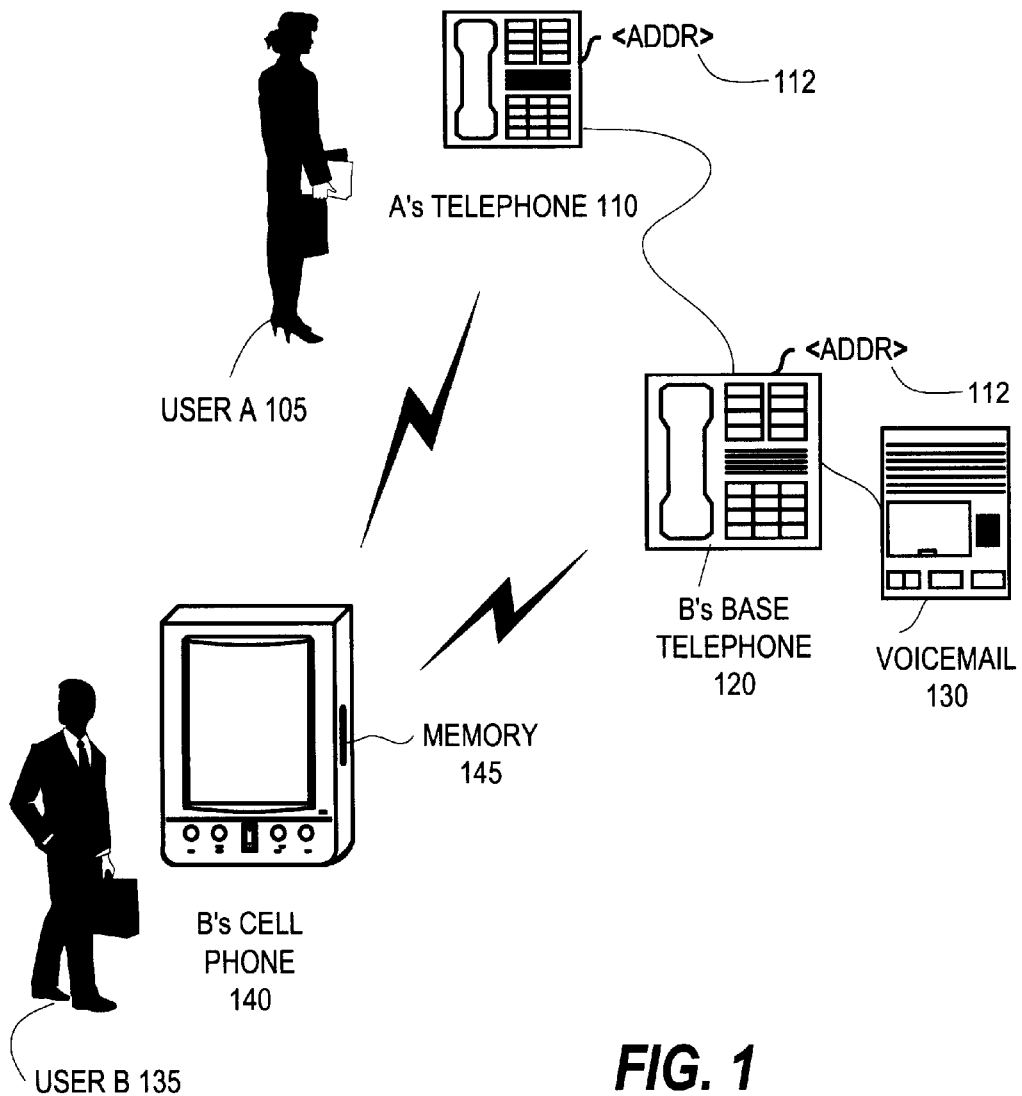
FIG. 1 illustrates aspects of the present invention in block diagram form, according to an embodiment.
FIG. 2 illustrates a key for authorizing message recording, according to an embodiment of the present invention.

Referring now to FIG. 1, aspects of the present invention are illustrated, according to an embodiment. User 105 (also referred to herein as a "caller"), has a telephone 110, on which she can call user 135 at his base phone 120. User 135 (also referred to herein as a "caller") has a voicemail system 130 connected to his telephone 120 so that if user 135 does not answer, user 105 can leave a recorded message thereon. Later, user 135 can call on cell phone 140 to check his voicemail messages on system 130. If for whatever reason user 135 wants to do so, the user 135 can copy or move one or more of the messages from voicemail 130 to memory 145 of his cell phone 140. (Herein the term "transfer" is used to include copying or moving.) For example, user 135 may not have time to listen to the voicemail 130 messages, but may have time to quickly transfer them in order to listen to them later.

Since voicemail 130 announces to a caller that the caller's message is being recorded, if user 105 leaves a recorded message on voicemail system 130, she obviously gives her consent to having her message recorded. Moreover, since it is widely known that voicemail messages are frequently forwarded so that someone else can listen to them, user 105 implies by leaving her message that she also authorizes distribution of the recording. In this case, it is also reasonably assumed there are no rights that user 105 intends to reserve that prohibit transferring her message to the memory 145 of cell phone 140. However, memory 145 can alternatively be put to other message-recording uses that could violate a message sender's rights. For example, memory 145, can be used to record live conversations, such as a conversation directly between user 105 on telephone 110 and user 135 on cell phone 140. Recording such a live message may violate the rights of user 105. Consequently, according to an embodiment of the present invention a useful means is provided for distinguishing between authorized and unauthorized message-recording uses of memory 145.

Referring now to FIG. 2 in conjunction with FIG. 1, a key 200 for authorizing message recording is illustrated, according to an embodiment of the present invention. Voicemail system 130 automatically embeds such a key 200 in a message recorded by the system 130, for sending in association with the message if the message is transferred to another apparatus such as memory 145 of cell phone 140. According to the illustrated embodiment, key 200 includes tags as delimiters. That is, the tag "<beginkey>" is at the beginning and tag "<endkey>" is at the end of the key 200. Key 200 also includes tags indicating the date and time the message is recorded by voicemail system 130, as well as addresses indicating the source of the message.

According to the embodiment, telecommunications devices are given unique, universally understood addresses for the purpose of including them in keys 200, among other reasons. These addresses are analogous to the machine addresses currently assigned to Ethernet cards. In an alternative embodiment, the address in key 200 is merely the telephone number of the apparatus originating the recorded message. In the example, the telephone 110 for user 105 has an address 112 which is embedded in the tag represented as "<ADDR1>" for key 200, indicating that the message originated at telephone 110. The telephone 120 for user 135 also has an address 112 which is embedded in the tag represented as "<ADDR2>" for key 200, indicating that the message was directed to the user of telephone 120 and recorded in association with that telephone 120.

Finally, the key has a tag, represented in FIG. 2 as "<AUTH>," indicating the nature of the authorization granted for distribution, that is, transfer, of the message to another apparatus. In the previously described example, the authorization tag merely indicates that the message was originally recorded with the consent of user 105, which implies that authorization has been granted for distribution, i.e., "re-recording." In other embodiments, which are described further herein below, the authorization tag indicates authorizations of a different nature.

Figure 3:
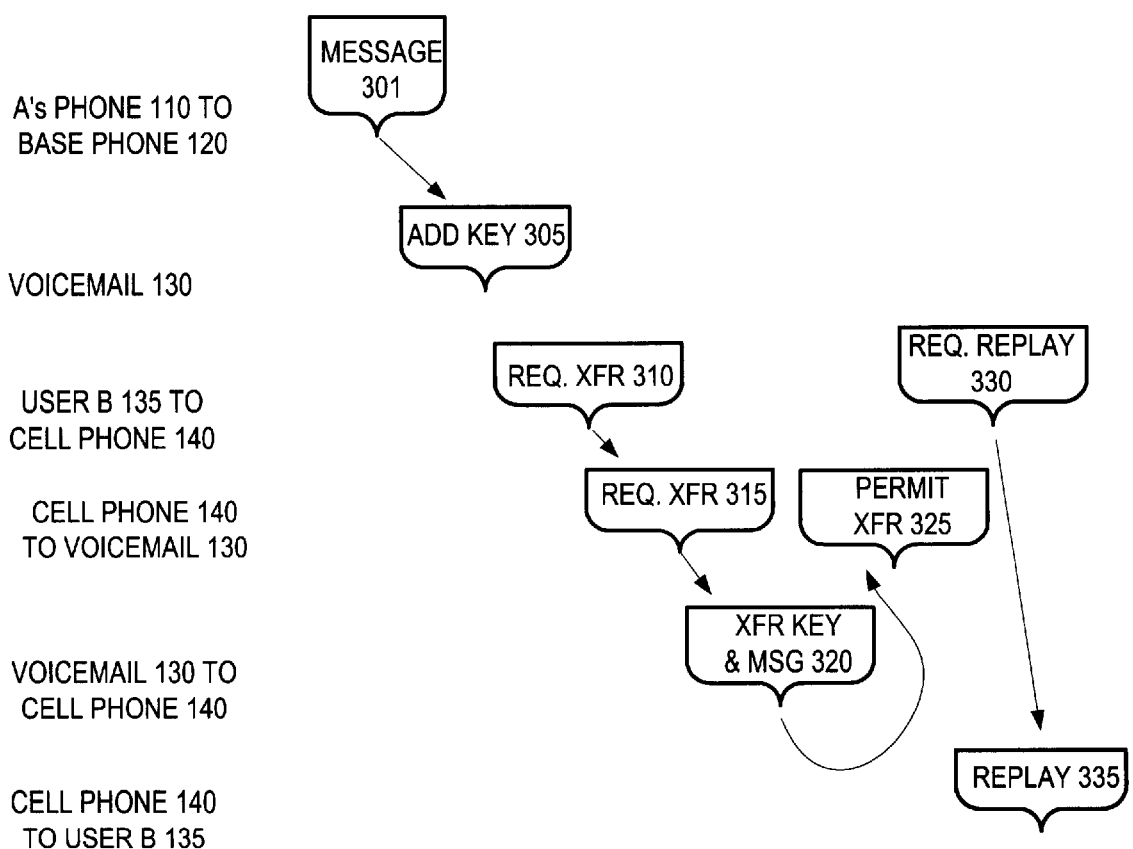
FIG. 3 illustrates timing of a sequence of certain events and certain logic aspects which relate to authorizing re-recording of a message, according to an embodiment of the present invention.

Referring now to FIG. 3 in conjunction with FIG. 1, timing of a sequence of certain events and certain logic aspects are illustrated which relate to authorizing re-recording of a message, according to an embodiment of the present invention. First, a message 301 is communicated, from user 105 telephone 110, to user 135 telephone 120, and recorded on voicemail system 130. Next, responsive to the message 301, voicemail system 130 adds a key 305 to the message, as previously described, indicating that the message was originally recorded with the consent of user 105, and that authorization has been impliedly granted for distribution.

Then, user 135 commands his cell phone 140, such as by pushing a button on the phone 140, to download messages from his base phone 120 voicemail 130 to the cell phone's memory 145, which includes requesting transfer 310 from VMS 130. Responsive to the request 310, cell phone 140 calls into the voicemail system 130 and requests transfer 315 of messages, including message 301. Responsive to the transfer request 315, VMS 130 attempts to transfer 320 messages and their associated keys to memory 145. Cell phone 140 checks the messages for respective keys 200 and if authorization is indicated the transfer 320 is permitted 325. Any messages that do not have proper keys 200 are not permitted to transfer. In an alternative embodiment, depending on user 135 programming of phone 140, transfer is permitted for a message not authorized for transfer but a notice is attached to the message indicating this condition.

Then, when user 135 is ready to listen, the user 135 commands 330 his cell phone 140, such as by pushing a button on the phone 140, to replay 335 the saved messages.

Figure 4:
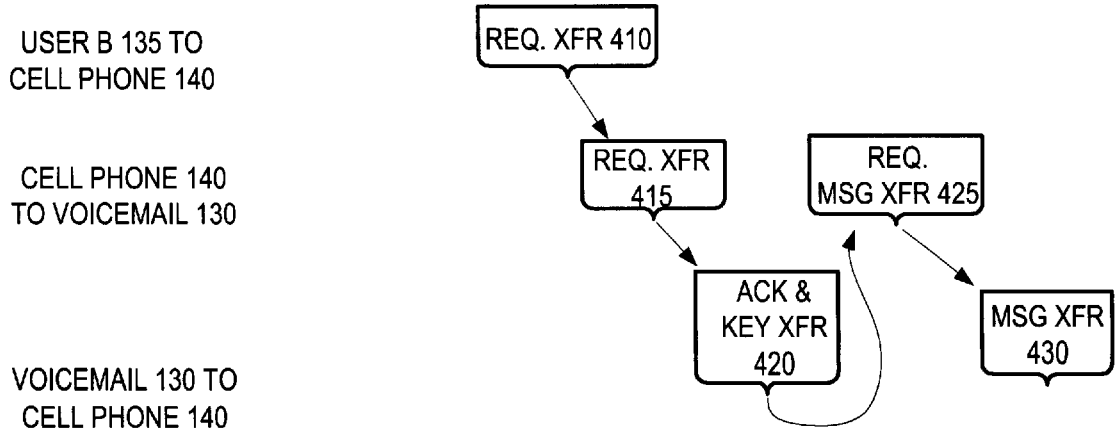
FIG. 4 illustrates an alternative embodiment for timing and logic of some of the events of FIG. 3.

Referring now to FIG. 4 in conjunction with FIG. 1, an alternative embodiment is illustrated for timing and logic of the sequence of events 310 through 320 of FIG. 3. According to this embodiment, user 135 commands his cell phone 140, such as by pushing a button on the phone 140, to download messages from his base phone 120 voicemail 130 to the cell phone's memory 145, which includes requesting transfer 410 from VMS 130. Responsive to request 310, cell phone 140 calls into the voicemail system 130 and requests transfer 415 of messages, including message 301. Responsive to transfer request 415, VMS 130 acknowledges the request 315 and transfers 420 the key but does not yet transfer the message, pending phone 140 checking the key. After the phone 140 confirms the key, the phone 140 requests transfer 425 of the message. Responsive to the transfer request 425, the VMS 130 transfers 430 the message.

Figure 5:
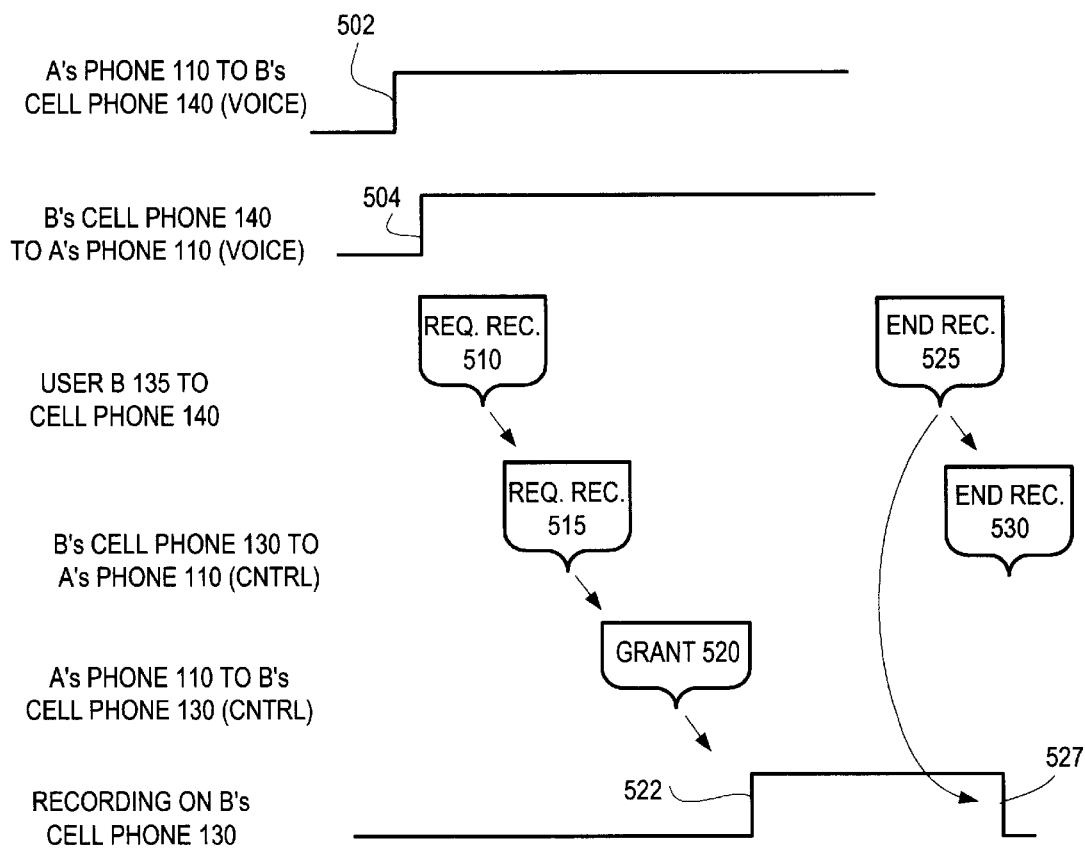
FIG. 5 illustrates timing of a sequence of certain events and certain logic aspects which relate to authorizing recording and transfer of a live message, according to an embodiment of the present invention.

As previously mentioned, memory 145 can also be used for recording live conversations. Referring now to FIG. 5 in conjunction with FIG. 1, timing of a sequence of certain events and certain logic aspects are illustrated which relate to authorizing recording and transfer of a live message, according to an embodiment of the present invention. At 502 user 105 initiates a call to the cell phone 140 of user 135. Responsive to the incoming call 502, user 135 answers 504, establishing two-way voice communication between phone 110 and phone 140. If user 135 decides that he wants to record something that user 105 is saying or going to say then user 135 commands 510 his cell phone 140, such as by pushing a button on the phone 140, to request permission to record. In response, cell phone 140 sends to phone 110 a digital request 515 for permission. According to this embodiment, the request itself is not directly audible to user 105, although it is imbedded in the same signal carrying the voice communication.

In the illustrated instance, user 105 has previously programmed her telephone to automatically grant permission to record in response to any such request. Further, user 105 has programmed her phone 110 not to notify her of such requests. Consequently, in response to the request 515 telephone 110 automatically sends digital control information 520 back to cell phone 140 indicating that permission to record has been granted. According to the embodiment, the control information includes a key 200 (FIG. 2) identifying telephone 110, etc., as previously described. Responsive to receiving permission, cell phone 140 begins recording 522, which includes saving the voice communication in memory 145.

Eventually, user 135 decides to stop recording and 525 commands his cell phone 140 to stop, such as by pushing a button on the phone 140. In response, the cell phone 140 stops recording 527. Also in response to the command 525, the cell phone 140 sends control information 530 to telephone 110 notifying that recording has stopped. Since in the present embodiment user 105 has programmed her phone 110 not to notify her, this notification 530 to telephone 110 does not produce a direct signal to user 105, audible or otherwise.

Figure 6:
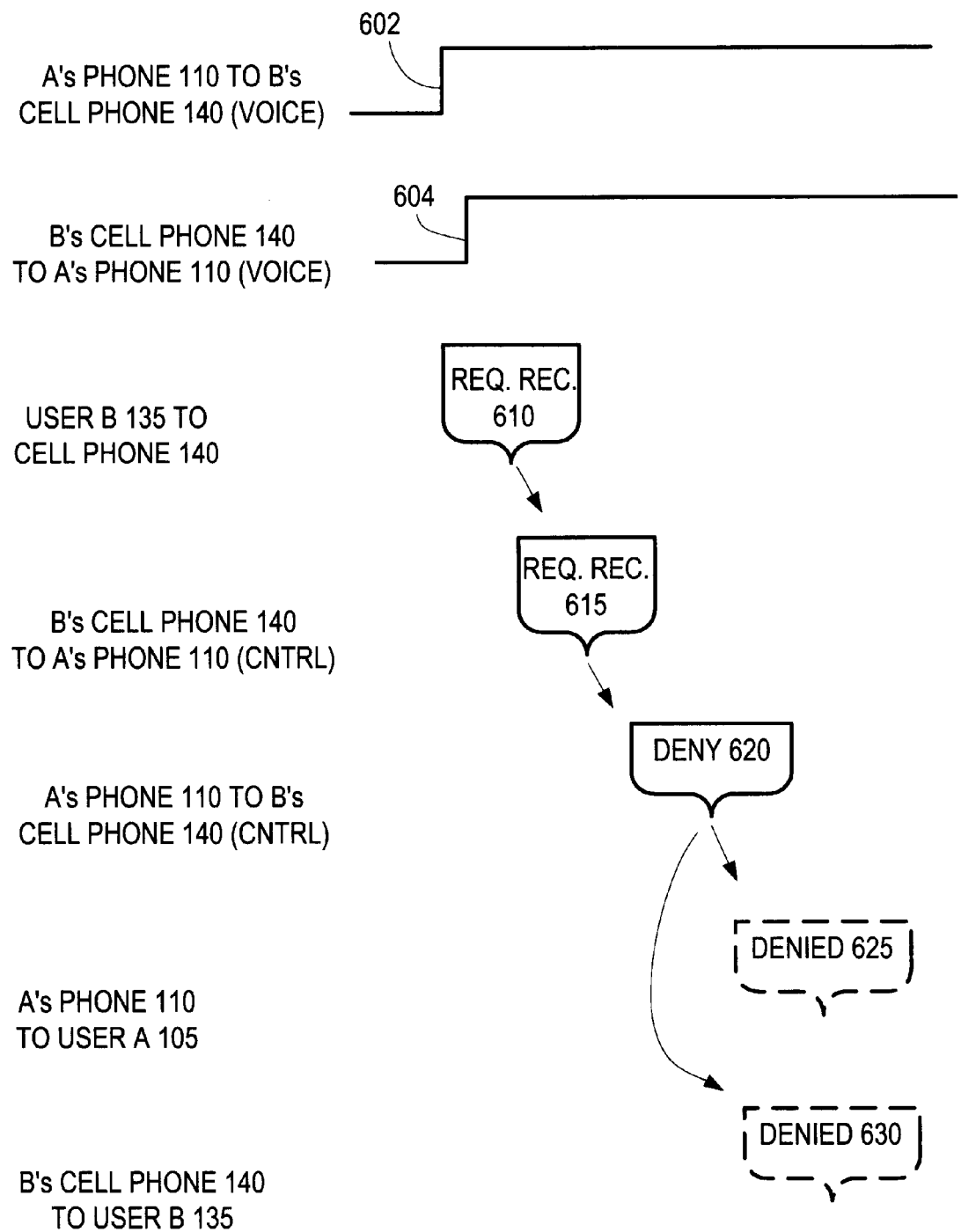
FIG. 6 illustrates timing of a sequence of certain events and certain logic aspects which relate to authorizing recording of a live message, according to an embodiment of the present invention in which a user has programmed her phone differently than in FIG. 5.

Referring now to FIG. 6 in conjunction with FIG. 1, timing of a sequence of certain events and certain logic aspects are illustrated which relate to authorizing recording of a live message, according to an embodiment of the present invention in which user 105 has programmed her phone 110 differently than in the previous example. At 602 user 105 initiates a call to the cell phone 140 of user 135. Responsive to the incoming call 602, user 135 answers 604, establishing two-way voice communication between phone 110 and phone 140. During the course of the conversation, user 135 commands 610 his cell phone 140 to request permission to record. In response, cell phone 140 sends 615 to phone 110 a digital request to record. Again, according to this embodiment, the request is imbedded in the same signal carrying the voice communication but is not audible to user 105.

As in the previous example, user 105 has programmed her phone 110 not to notify her of requests to record. However in this instance, user 105 has programmed her telephone to automatically deny permission to record in response to any such request. Consequently, telephone 110 automatically sends 620 control information back to cell phone 140 indicating that permission to record has been denied. Responsive to receiving this indication, cell phone 140 does not record and notifies user 135 of the denial, such as by an audible signal and a written explanation on the display of cell phone 140.

Generation of a denial notice is a programmable feature. That is, in the example, if user 135 has so programmed the phone 140 then user 135 receives an audible notice 630 of denial in response to denial 620. But user 135 can also program the phone 140 not to notify him of receiving a denial, or to notify only with an inaudible message. Likewise, user 105 can program her phone whether to notify her of sending a denial. Depending on how user 105 has programmed her phone 110 to notify her, the automatic denial 620 by her phone 110 generates 625 an audible signal or a written explanation on the display of telephone 110.

Figure 7:
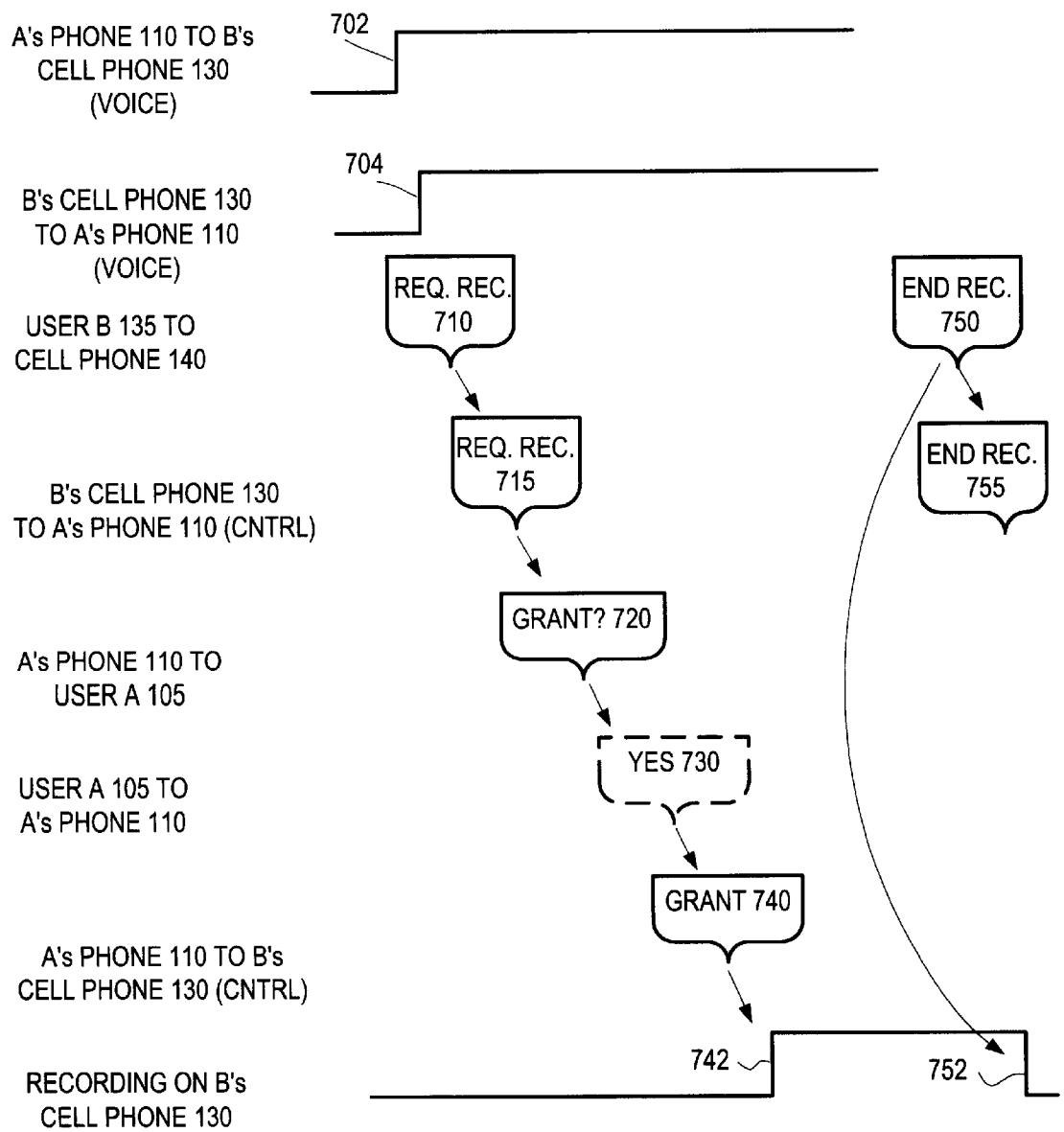
FIG. 7 illustrates timing of a sequence of certain events and certain logic aspects which relate to authorizing recording of a live message, according to an embodiment of the present invention in which a user has programmed her phone differently than in FIGS. 5 and 6.

Referring now to FIG. 7 in conjunction with FIG. 1, timing of a sequence of certain events and certain logic aspects are illustrated which relate to authorizing recording of a live message, according to an embodiment of the present invention in which user 105 has programmed her phone 110 differently than in the previous examples. User 105 initiates a call 702 to the cell phone 140 of user 135. Responsive to the incoming call 702, user 135 answers 704, establishing two-way voice communication between phone 110 and phone 140. During the course of the conversation, user 135 commands 710 his cell phone 140 to request permission to record. In response, cell phone 140 sends to phone 110 a digital request 715 to record. Again, according to this embodiment, the request 715 is imbedded in the same signal carrying the voice communication but is not audible to user 105.

In this example user 105 has programmed her phone 110 to notify 720 her of a request to record, so she receives this notice 720 and then the phone 110 waits to receive a command from her about whether to grant permission to record. In the example, user 105 grants permission 730, such as by a spoken command or by pushing a button on phone 110. Responsively, telephone 110 automatically sends control information 740, including key 200 (FIG. 2), back to cell phone 140 indicating that permission to record has been granted.

Responsive to receiving permission, cell phone 140 begins recording 742, which includes saving the voice communication and associated key 200 in memory 145. Eventually, user 135 decides to stop recording and commands 750 his cell phone 140 to stop, such as by pushing a button on the phone 140. In response, the cell phone 140 stops recording 752. Also in response to the command 750, the cell phone 140 sends control information 755 to telephone 110 notifying that recording has stopped.

Figure 8:
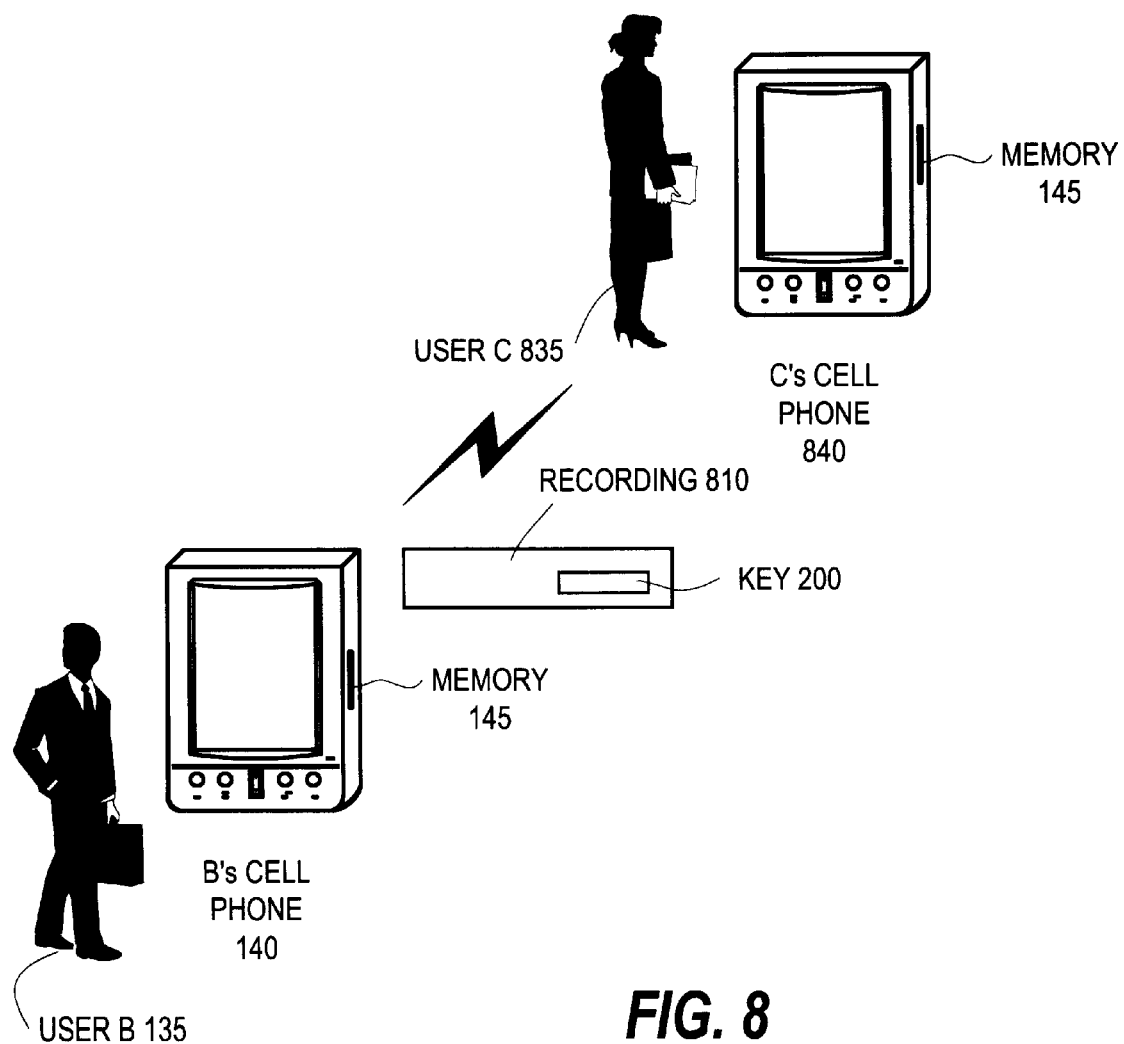
FIG. 8 illustrates use of the key to authorize re-recording of a live recording obtained in the context of FIG. 7, according to an embodiment.

Referring now to FIG. 8, use is illustrated of the key 200 for authorizing re-recording of a live recording obtained in the context of FIG. 7, according to an embodiment. After the sequence of events illustrated in FIG. 7, a recording 810 in memory 145 has a key 200 associated with it as shown. The key 200 indicates that distribution of the recording 810 has been authorized and provides further details as previously described. As shown, user 135 transfers the recording 810 with the key 200 to cell phone 840 memory 845 of another user 835. The cell phone 840 checks the recording for the key 200 indicating permission to transfer, just as was described for cell phone 140 in the transfer of FIG. 3.

It should be understood that the user 135 may likewise transfer the recording 810 and key 200 to a voicemail system, such as voicemail 130 of FIG. 1, and that the voicemail system will permit the transfer or not depending on presence of key 200 for the recording 810. It should also be understood that in an alternative embodiment the source apparatus polices transfers rather than the destination apparatus. That is, in the example, with respect to phone 140 and phone 840, cell phone 140 is the source apparatus for the recording 810 to be transferred. Thus, in one alternative embodiment, phone 140 determines whether it is permitted to transfer to another apparatus, by checking recording 810 for a key 200.

Figure 9:
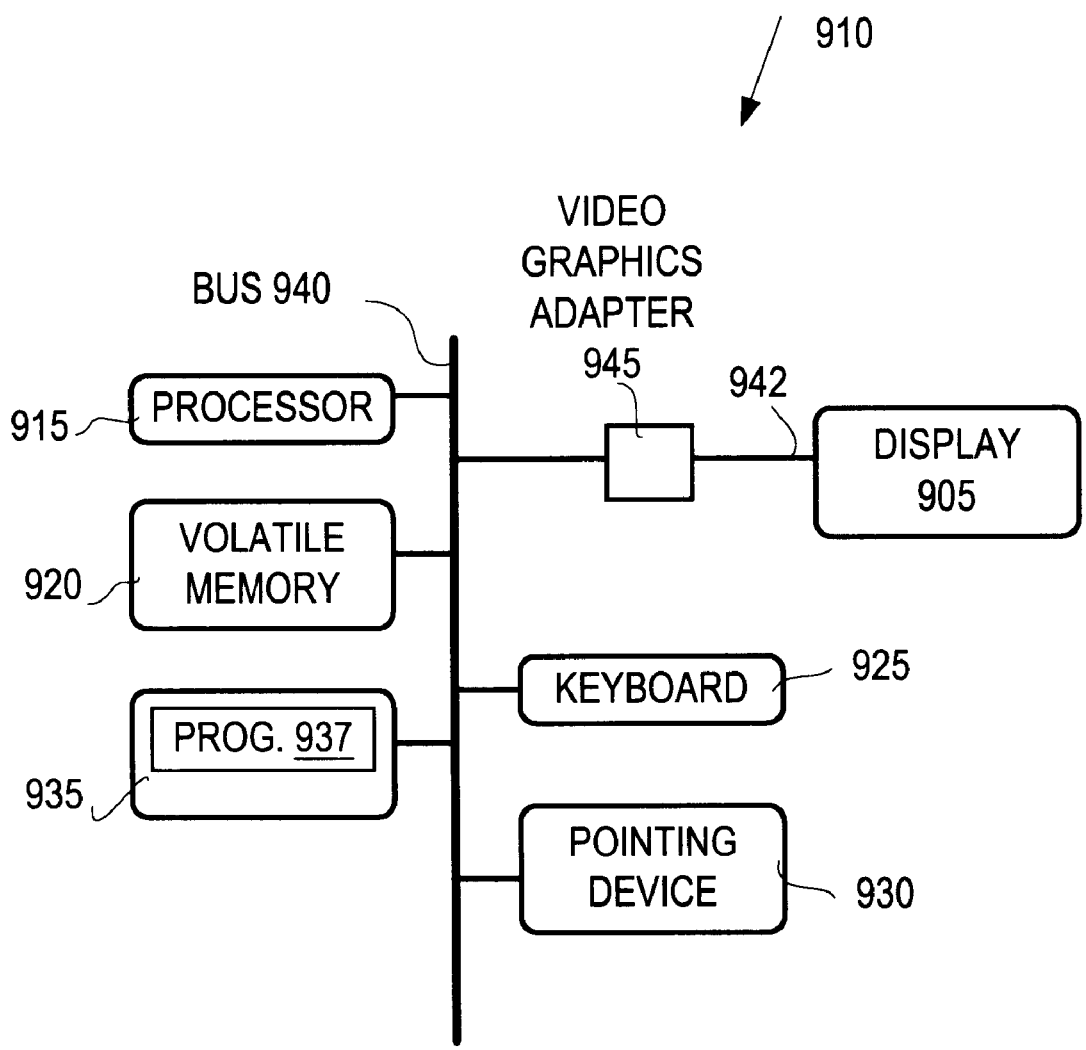
FIG. 9 illustrates a computer system that is generally applicable for the various telephones and voicemail systems described herein, according to an embodiment.

Referring now to FIG. 9, a computer system 910 shown that is generally applicable for the various telephones and voicemail systems described herein, according to an embodiment. Computer system 910 has a processor 915, a volatile memory 920 (that is, random access memory, for example), a nonvolatile memory 935 (for example, read only memory, hard disk, floppy disk, CD-ROM, etc.), and a display unit 905. The display unit 905 receives a video signal 942 from video graphics adapter 945. The memory 920 and 935 are for storing programs 937 for controlling the processor 915. Processor 915 is operative with the programs 937 to perform as described herein. These components in the system 910 are interconnected by bus 940.

In various embodiments the system 910 also has a keyboard 925 and a pointing device 930, such as a mouse, trackball, touch pad, touch sensitive display 905, etc. The keyboard 925 is a device of the sort that is sometimes referred to as a "data entry" device. In other embodiments, the system 910 includes a data entry device such as a microphone for receiving voice commands, a keypad, buttons etc., and may or may not omit the keyboard 925.

In various embodiments system 910 takes a variety of forms, including a personal computer system, mainframe computer system, workstation, Internet appliance, personal digital assistant ("PDA"), conventional telephone, cell phone, appliance with embedded processor and memory, etc. That is, it should be understood that the term "computer system" is intended to encompass any device having a processor that executes instructions from a memory medium. The memory medium preferably stores instructions (also known as a "software program" or simply "program") for implementing various embodiments of a method in accordance with the present invention. In various embodiments the one or more software programs are implemented in various ways, including procedure-based techniques, component-based techniques, and/or object-oriented techniques, among others. Specific examples include XML, C++ objects, Java and Microsoft Foundation Classes (MFC).

The description of the present embodiment has been presented for purposes of illustration, but is not intended to be exhaustive or to limit the invention to the form disclosed. Many modifications and variations will be apparent to those of ordinary skill in the art. For example, those of ordinary skill in the art will appreciate that processes of the present invention are capable of being performed by a processor responsive to stored instructions, and accordingly some or all of the processes may be distributed in the form of a computer readable medium of instructions in a variety of forms and that the present invention applies equally regardless of the particular type of signal bearing media actually used to carry out the distribution. Examples of computer readable media include RAM, flash memory, recordable-type media, such a floppy disk, a hard disk drive, a ROM, and CD-ROM, and transmission-type media such as digital and analog communications links, e.g., the Internet.

In various embodiments, the authorization tag of the key indicates a variety of types of authorizations. In one embodiment, the authorization expires after a set period of time, such as 30 days. That is, after 30 days the message can no longer be transferred. In another embodiment, the authorization limits the number of times a message can be transferred. For example, the message cannot be transferred more than five times. In another embodiment, the authorization does not permit the message to be translated into another language. That is, the message sender may want to ensure that the message is heard only in the proper context. In another embodiment, the authorization may prohibit the message from being translated into another language in its audio form, but may permit translation in written form, i.e., transcription.

It should be understood that while the recording of a live message has been described as being done by a message-recorder of cell phone 140 in FIG. 1, this could also be done for base phone 120 by voicemail system 130 if user 135 were on this phone 120 instead. In this case, the base phone 120 or voicemail system 130 would perform the functions described above for the cell phone 140.

In the embodiments described above, it was the receiver's phone that sent requests for permission to record. In an alternative embodiment, the sender's phone sends a key at the beginning of the call either authorizing, limiting or prohibiting recording, so that the receiver's phone does not need to send a query.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention. Moreover, it should be understood that the actions in the following claims do not necessarily have to be performed in the particular sequence in which they are set out.

What is claimed is:

1. A method for authorizing distribution of a telephone message recording, the method comprising:
   announcing for a first message-recording apparatus that a telephone caller can record a message;
   recording the message by the first message-recording apparatus;
   automatically associating a key with the message; and
   sending the key to a second message-recording apparatus, wherein the key includes an authorization tag that authorizes transferring the message to the second message-recording apparatus such that the second message recording apparatus will not record the message without the authorization tag.

2. The method of claim 1, comprising:
   generating the key by the first message-recording apparatus.

3. The method of claim 1, comprising:
   receiving, by the first message-recording apparatus, at least a portion of the key from a telephone of the caller.

4. The method of claim 1, wherein the key is included with the recorded message, and the sending of the key is responsive to the message being transferred to the second message-recording apparatus.

5. The method of claim 1, wherein the first message-recording apparatus determines, responsive to the presence or absence of the key, whether to permit transferring the message.

6. The method of claim 1, wherein the second message-recording apparatus determines, responsive to the presence or absence of the key, whether to permit transferring the message.

7. The method of claim 1, wherein the key comprises at least one of the following:
   an address of a telephone of the caller; and
   an address of the first message-recording apparatus.

8. The method of claim 1, wherein the key comprises at least one of the following:
   a date; and
   a time.

9. A message-recording apparatus for authorizing distribution of a telephone message recording, the apparatus comprising:
   a processor; and
   a memory having instructions and being operable to communicate with the processor, wherein the processor is operable with the instructions to announce for the apparatus that a telephone caller can record a message, record the message in the memory, and automatically associate a key with the message, wherein the processor is operable with the instructions to send the key for the message to a second message-recording apparatus, wherein the key includes an authorization tag that authorizes transferring the message to the second message-recording apparatus such that the second message recording apparatus will not record the message without the authorization tag.

10. The apparatus of claim 9, wherein the processor is operable with the instructions to generate the key.

11. The apparatus of claim 9, the processor is operable with the instructions to receive at least a portion of the key from a telephone of the caller.

12. The apparatus of claim 9, wherein the processor is operable with the instructions to include the key with the recorded message to the second message-recording apparatus, and the sending of the key is responsive to the message being transferred.

13. The apparatus of claim 9, wherein the first message-recording apparatus determines, responsive to the presence or absence of the key, whether to permit transferring the message.

14. The apparatus of claim 9, wherein the second message-recording apparatus determines responsive to the presence or absence of the key whether to permit transferring the message.

15. The apparatus of claim 9, wherein the key comprises at least one of the following:
   an address of a telephone of the caller;
   and an address of the first message-recording apparatus.

16. The apparatus of claim 9, wherein the key comprises at least one of the following:
   a date; and
   a time.

17. A computer program product for authorizing distribution of a telephone message recording, the computer program product comprising:

instructions for announcing for a first message-recording apparatus that a telephone caller can record a message;

instructions for recording the message by the first message-recording apparatus; and instructions for automatically associating a key with the message; and instructions for sending the key for the message to a second message-recording apparatus, wherein the key includes an authorization tag that authorizes transferring the message to the second message-recording apparatus such that the second message recording apparatus will not record the message without the authorization tag.

18. The computer program product of claim 17, comprising:

instructions for generating the key by the first message-recording apparatus.

19. The computer program product of claim 17, comprising:

instructions for receiving, by the first message-recording apparatus, at least a portion of the key from a telephone of the caller.

20. The computer program product of claim 17, comprising:

instructions for including the key with the recorded message, wherein the sending of the key is responsive to the message being transferred to the second message-recording apparatus.

21. The computer program product of claim 17, comprising:

instructions for determining by the first message-recording apparatus, responsive to the presence or absence of the key, whether to permit transferring the message.

22. The computer program product of claim 17, wherein the key comprises at least one of the following:

an address of a telephone of the caller; and an address of the first message-recording apparatus.

23. The computer program product of claim 17, wherein the key comprises at least one of the following:

a date; and a time.

24. The method of claim 1, wherein for the step of announcing for a first message-recording apparatus that a telephone caller can record a message, the telephone caller includes a first party and the message includes an incoming message for a second party, and for the step of sending the key to a second message-recording apparatus, the second message recording apparatus is for a third party.

25. The apparatus of claim 9, wherein the telephone caller includes a first party and the message that the first party caller can record includes a message for a second party, and wherein the second message recording apparatus is for a third party.

26. The computer program product of claim 17, wherein the telephone caller includes a first party and the message that the first party caller can record includes a message for a second party, and wherein the second message recording apparatus is for a third party.

* * * * *